G. C. GLYNN.
PLASTIC SURFACE COVERING.
APPLICATION FILED JAN. 18, 1919.
1,348,278.　　　　　　　　　　　　　Patented Aug. 3, 1920.
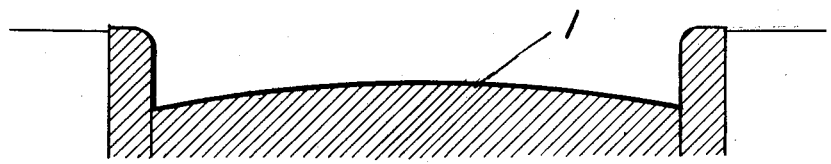
Fig. I.
Fig. II.　Stone
Fig. III.　Colloidal soil and bitumen
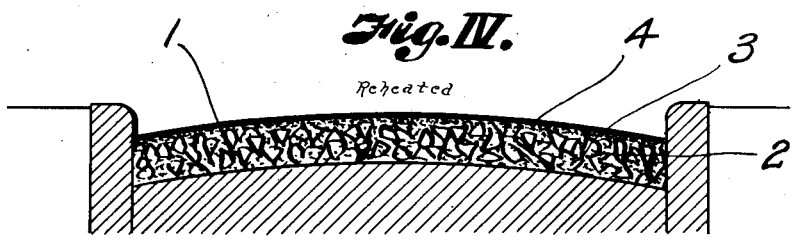
Fig. IV.　Reheated
INVENTOR
Guilford Cresse Glynn.
BY
ATTORNEY

UNITED STATES PATENT OFFICE.

GUILFORD CRESSE GLYNN, OF KANSAS CITY, KANSAS, ASSIGNOR OF ONE-HALF TO P. A. HILDERBRAN, OF KANSAS CITY, MISSOURI.

PLASTIC SURFACE-COVERING.

1,348,278.	Specification of Letters Patent.	Patented Aug. 3, 1920.

Continuation of application filed February 26, 1917, Serial No. 151,014. This application filed January 18, 1919. Serial No. 271,914.

*To all whom it may concern:*

Be it known that I, GUILFORD CRESSE GLYNN, a citizen of the United States, residing at Kansas City, in the county of Wyandotte and State of Kansas, have invented certain new and useful Improvements in Plastic Surface-Coverings; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This application is a continuation of an application filed by me February 26th, 1917, Serial No. 151,014.

My invention relates to plastic surface coverings for roofs, roadways and the like and the method of making the same, and has for its principal object to produce a surface covering wherein inherent stability is effected by filling the voids of and coating a mineral aggregate base with a mixture of bitumen and colloidal soil capable of transformation into a plastic solid, as distinguished from other mixtures, which I term viscous solids, such as the usual sheet asphalt mixture and solids of like nature, in which the properties of the fluid phase predominate.

All surfaces, heretofore constructed with bitumen and stone aggregate, have relied upon the bitumen as a binding agent, and the arrangement of the stone for stability; mixing of aggregate for void reduction and choice of bitumen for resistance to temperature changes. These mixtures have ranged from coarse rock, insufficiently coated with heated bitumen, to asphaltic concrete and even sheet asphalt mixtures, all dependent, to a degree, upon the properties of the bitumen for a binder and the arrangement of the aggregate for the so-called inherent stability.

Such surfaces are subject to disadvantages which I overcome, such as voids, water absorption, and in roadways, change of form and displacement under traffic, shoving or rolling, especially with temperatures above 80°, and disintegration of the rock by impact, but most of all the initial high cost and difficulty of continuous maintenance and repair.

It is evident that economical reconstruction of such surfaces requires the use of expensive heating and mixing plants wherein the stone and bitumen are confined and then hauled upon the roadway, or, in the less efficient style of surfaces, the bitumen must be heated and used in a fluid state and in large excess if the void spaces are completely filled, which obviously adds greatly to the cost in addition to increasing the liability to deform or flow under the combined action of heat in roofs and both heat and traffic in roadways. If incompletely filled, uniformity in the distribution of the void spaces is impossible and such void spaces result in a lack of the inherent stability acknowledged by the adherents of this theory of pavement construction to be essential to economic success.

Repair of such surfaces likewise requires expensive equipment for heating and distributing the bitumen and, in some instances, as in sheet asphalt mixtures, and mixing and distribution of the heated aggregate.

I have mentioned these instances at some length so as to purposely disclaim the same.

To impart a clear understanding of the invention, I have illustrated the surface covering in its several stages of construction in the accompanying drawings, wherein:

Figure I is a vertical cross section of a surface prepared for covering.

Fig. II is a similar view after the stone has been applied to the surface.

Fig. III is a similar view after the mixture of colloidal soil and bitumen has been poured into the stone.

Fig. IV is a similar view after the covering has been heated to render it immune to change.

In my process, I prefer to proceed as if I were attempting to construct an ideal macadam roadway, it being understood that for roofs the method will be substantially the same except for the preparation of the base. The surface 1 is given particular attention to secure stability by draining off excess water, and preventing the access of the same to the base, compaction by puddling, rolling, or both, and the admixture of sand, stone, screening or other comparatively insoluble material, if required, upon this prepared base. The stone 2 is spread in the usual layers of the desired thickness, utilizing the finer materials in the bottom layers and, by preference, allowing the coarser stone, preferably of 1½ to 2 inches in size, for the top, thoroughly compacting the stone mass by harrowing and puddling, combined with rolling at the proper time.

Upon this coarse stone top is then poured the mixture of colloidal soil and bitumen 3, preferably prepared in accordance with the method disclosed in my co-pending application, Serial Number 138,133, that is, wherein soil containing colloidal material, a deflocculating reagent, such as sodium carbonate, and water are stirred to defloculate the soil, the deflocculated mass heated, and fluid bitumen added thereto to coat the individual soil particles.

The mud that is poured into the aggregate first consists of solids, dispersed particles, possessed of colloidal properties and surrounded with an absorbed aqueous film, combined with water as a dispersive medium, such water containing an electrolyte capable of furnishing an excess of hydroxyl or basic ions in the dispersive medium. To this is added the fluid bitumen, which forms a coating upon the aqueous, bituminous film-absorbed solid particles as the dispersoid, and free water of alkaline reaction, together with free, minute globules of minor quantities of the added bitumen in suspension therein.

Such emulsions are a liquid mixture in which the fatty, resinous, or asphaltic substance is suspended in minute globules in the dispersive medium.

The bitumen I mention is not emulsified at all—or only to a minor degree. It can readily be separated mechanically by proper procedure. It is simply free bitumen, and I do not wish to make any claim for emulsification or any of the alleged actions resulting therefrom.

When the excess or free water escapes from this mud, it is obvious that I have a material which is in the condition of two discontinuous phases, unless the adherent film water at the plastic stage should be termed the continuous phase, and upon further drying the particles coated become continuous only at the points of contact.

Such a material is still more or less capable of dispersion by the addition of water, in that it can be remade into mud, but is very slowly absorptive of cold water.

This transition stage is very important, practically, as it allows of the use of water to cause the required dispersion requisite to incorporation of the bituminous mud, cold if desired, so that the material can be shipped and handled practically dry, and re-suspended in water for incorporation, adding greatly to economy and facility of use.

The bituminous mud, in its originally thin condition or as made thus by remixture with water, when poured onto the mineral aggregate, fills the voids therein, which, when limestone is used, usually approximates from 40 to 44 per cent. of the top three inches.

Owing to the excess water and extreme mobility of the mixture, especially when warm, due to the minute size of the particles in suspension and then dispersive deflocculating effect of the added reagent, the bituminous mud thoroughly fills the void spaces, acting like a liquid.

It is sometimes of advantage to place the mud in successive pourings, thereby allowing the moisture to escape from thinner layers, which it does both by capillarity and evaporation with greater facility than in the thicker layers.

Upon the escape of the moisture the bituminous mud shrinks and reaches a plastic stage where it is no longer dispersed in free water, but is a plastic solid with intervening films of water closely adherent to the bituminous coated particles which were previously in suspension.

Such a mass is capable of compaction so that any opening caused by shrinkage can be closed by plastic flow, or by filling such openings and compacting the mass. Such a phasic condition should not be confused with one in which liquid particles are dispersed in a liquid medium, as are emulsions and compounds when it is sought to make the bitumen a continuous dispersive medium.

After the bituminous mud has been poured into the aggregate, it is compacted while plastic and dried to a substantially solid condition. I then effect the change that renders it practically immune from further change, namely, the application of heat.

When the surface 4 has been completed and the voids completely filled, the mass is a stable, fractureless, solid, capable of withstanding any loading that it would be possible for the base to support, and no longer subject to deformation and flow as with free bitumen. It is, however, still susceptible to long continued action of water in excess, so that to reach the final, perfected state, the bitumen must be softened in the mass, so that amalgamation and readjustment of the films occur, together with the flowing of the excess free globules of bitumen into any voids left by the egress of the water.

Thus a plastic solid, inherently stable in itself, immune from the ordinary effects due to changes in temperature, insoluble in water, and possessing all of the advantages of sheet pavement construction at a greatly reduced cost is produced.

It is apparent that resurfacing of an existing macadam can be effected in the same manner, except that the preliminaries of loosening the stone of the old pavement must be carired out.

Obviously manufacture and repair of a roadway constructed in accordance with my improvement is much simplified, as the conveniently stored mixture has only to be filled into, or incorporated with the stone, a process both simple and inexpensive, absolute uniformity of a roadway is thus assured and definite control of the properties thereof no longer conjectural.

Having thus described my invention, what I claim as new therein, and desire to secure by Letters-Patent, is:

The method of making surface coverings consisting of placing a loose stone surface, filling the voids of the surface with mud, formed from colloid containing soil and bitumen, drying the mass, heating the dried mass and compacting the mass.

In testimony whereof I affix my signature.

GUILFORD CRESSE GLYNN.